United States Patent
Jenkins et al.

(10) Patent No.: US 11,080,071 B2
(45) Date of Patent: Aug. 3, 2021

(54) GROUP EDITING SOFTWARE ENHANCEMENT

(71) Applicant: INTERNATIONAL BUSINESS MACHINES CORPORATION, Armonk, NY (US)

(72) Inventors: Jana H. Jenkins, Raleigh, NC (US); Hau Co, Sharon (CA); Joseph Lam, Markham (CA); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/690,879

(22) Filed: Nov. 21, 2019

(65) Prior Publication Data

US 2021/0157613 A1    May 27, 2021

(51) Int. Cl.
*G06F 3/048* (2013.01)
*G06F 9/451* (2018.01)
*G06F 16/93* (2019.01)
*G06F 16/176* (2019.01)

(52) U.S. Cl.
CPC .......... *G06F 9/451* (2018.02); *G06F 16/1774* (2019.01); *G06F 16/93* (2019.01)

(58) Field of Classification Search
CPC ...... G06F 3/048; G06F 3/0481; G06F 3/0482; G06F 3/0484; G06F 9/451; G06F 16/93; G06F 16/176
See application file for complete search history.

(56) References Cited

U.S. PATENT DOCUMENTS

| | | | |
|---|---|---|---|
| 7,949,633 B1* | 5/2011 | Shaver ................... | G06F 40/166 707/620 |
| 8,943,417 B2* | 1/2015 | Parker ................... | G06F 3/0484 715/751 |
| 9,146,615 B2 | 9/2015 | Scherpa | |
| 9,875,269 B1* | 1/2018 | Doak ................... | G06F 16/2343 |
| 10,140,392 B1* | 11/2018 | Bowen ................... | G06F 3/0482 |
| 10,242,430 B2* | 3/2019 | Red ........................... | G06T 5/00 |
| 2003/0009536 A1* | 1/2003 | Henderson .............. | H04L 29/06 709/219 |
| 2016/0239488 A1* | 8/2016 | Aguilon ................... | G06F 16/93 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Xiomara L Bautista
(74) *Attorney, Agent, or Firm* — Robert D. Bean

(57) ABSTRACT

According to one embodiment, a method, computer system, and computer program product for concealing distracting user interface elements within collaborative editing software is provided. The present invention may include monitoring activity on a computing device to identify the presence of collaborative editing and presentation programs, and responsive to determining that presenting users are conducting a presentation and that users are editing a digital collaborative document, concealing one or more graphical user interface elements; and, responsive to determining that the one or more presenting users are no longer conducting the presentation, graphically summarizing one or more changes to the digital collaborative document made during the presentation.

17 Claims, 6 Drawing Sheets

(56) References Cited

U.S. PATENT DOCUMENTS

| | | | |
|---|---|---|---|
| 2017/0272444 A1* | 9/2017 | Kopf | H04L 63/102 |
| 2018/0181266 A1* | 6/2018 | von Muhlen | H04L 67/42 |
| 2018/0314680 A1* | 11/2018 | Dorai | G06F 40/166 |
| 2018/0337968 A1 | 11/2018 | Faulkner | |
| 2019/0196775 A1 | 6/2019 | Masuda et al. | |
| 2019/0286462 A1* | 9/2019 | Bodnick | G06F 16/958 |
| 2019/0355181 A1* | 11/2019 | Srinivasan | G06F 3/04842 |

* cited by examiner

GROUP EDITING SOFTWARE ENHANCEMENT

BACKGROUND

The present invention relates, generally, to the field of computing, and more particularly to digital collaboration.

Digital collaboration is a field concerned with facilitating user interaction using digital technologies. Digital collaboration is notably embodied in software tools that allow multiple users to interact remotely over a network. For example, group editing tools enable multiple users to view and edit the same document in real time. Such group editing tools utilize a variety of user interface (UI) elements to illustrate to a user the activity of other users within the document. For instance, a group editing tool may graphically represent other users' cursors on the screen, and may visually associate identifying text or graphics with each cursor so identify the user to which it belongs. Likewise, changes made to the document may be highlighted and tagged with the user responsible for the change, so that each user's contribution may be visually apparent. In another example, presentation tools establish an audiovisual connection between multiple users, allowing the users to see and hear other users, and allowing a user to share his or her screen to the other users. Digital collaboration is an increasingly crucial field in the business world, enabling communication and collaboration between large numbers of disparately located individuals.

SUMMARY

According to one embodiment, a method, computer system, and computer program product for concealing distracting user interface elements within collaborative editing software is provided. The present invention may include monitoring activity on a computing device to identify the presence of collaborative editing and presentation programs, and responsive to determining that presenting users are conducting a presentation and that users are editing a digital collaborative document, concealing one or more graphical user interface elements; and, responsive to determining that the one or more presenting users are no longer conducting the presentation, graphically summarizing one or more changes to the digital collaborative document made during the presentation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
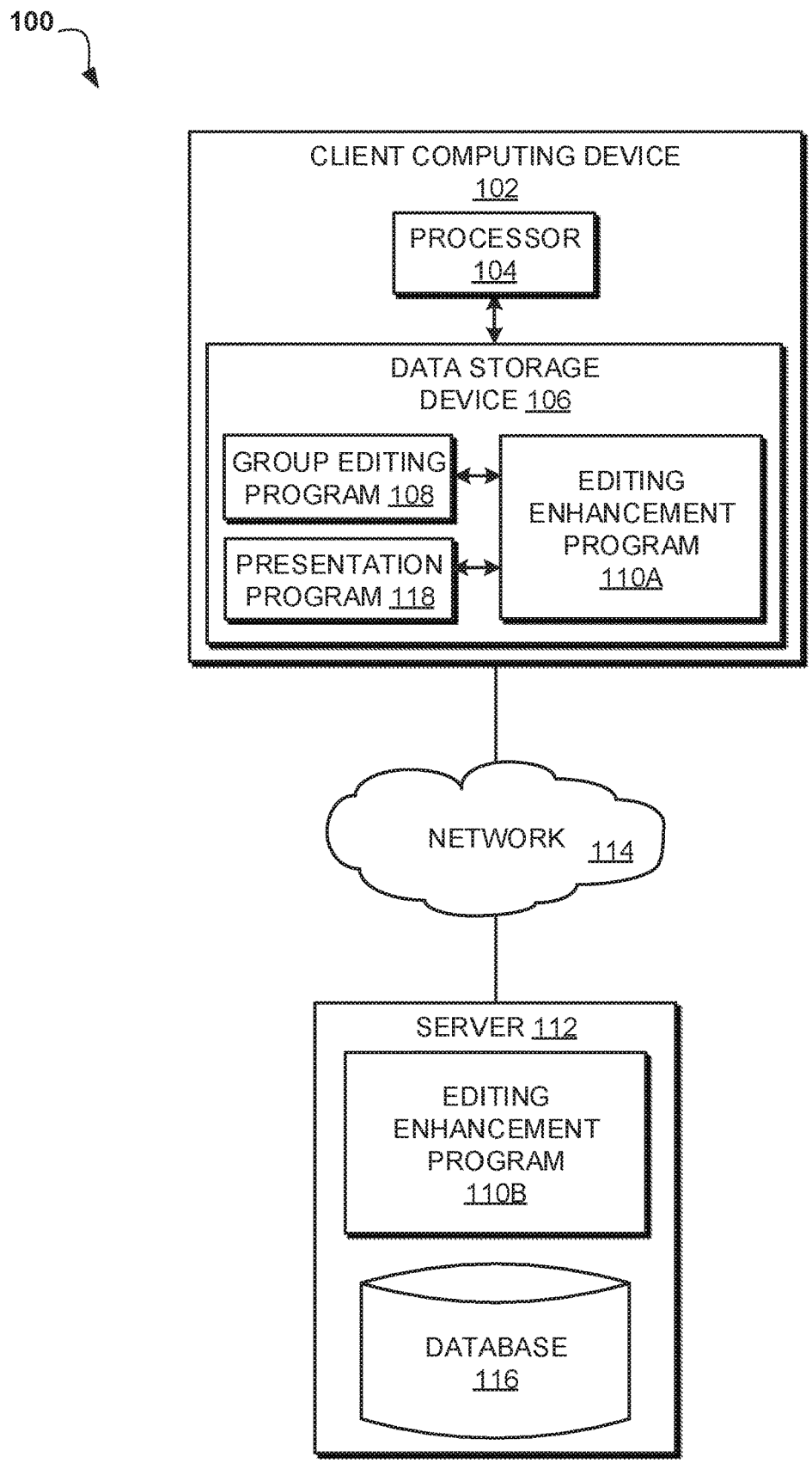
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital collaboration. The following described exemplary embodiments provide a system, method, and program product to, among other things, interface with presentation software and group editing software to identify when a user is presenting, hide distracting UI elements for the duration of the presentation, and summarize hidden changes to users when the presentation is over. The field of digital collaboration is a technical one insofar as it pertains to the use of digital technologies to enable collaboration between individuals; dramatically different from traditional collaboration, digital collaboration connects a broader network of participants who can accomplish far more than they could individually without the assistance of digital technologies. Digital collaboration tools utilize software and hardware elements enabling multiple users, potentially great distances apart geographically, to interact and view and/or edit the same document simultaneously over a network. A problem arising within this field is that user interface (UI) elements designed to identify users and illustrate changes in text can produce a detrimental effect on user engagement during audiovisual presentations, enabling behavior distracting to other users during a presentation, and thereby obstructing the absorption of information and detracting from the efficiency of the collaborative process. Embodiments of the present invention serve to improve the technical field of digital collaboration by producing a solution to the aforementioned problem which is necessarily rooted in computer technology; namely, by operating a computing device to identify the presence of both presentation software and group editing software running on the computing device, operating the computing device to remove UI elements from the visual display during the presentation to minimize distraction, and summarizing any executed changes via UI elements to a user when the presentation has concluded so that the removal of UI elements does not limit a user's awareness of changes made to the collaborative document.

As previously described, digital collaboration is a field concerned with facilitating user interaction using digital technologies. Digital collaboration is notably embodied in software tools that allow multiple users to interact remotely over a network. For example, group editing tools enable multiple users to view and edit the same document in real time. Such group editing tools utilize a variety of user interface (UI) elements to illustrate to a user the activity of other users within the document. For instance, a group editing tool may graphically represent other users' cursors on the screen, and may visually associate identifying text or graphics with each cursor so identify the user to which it belongs. Likewise, changes made to the document may be highlighted and tagged with the user responsible for the change, so that each user's contribution may be visually apparent. In another example, presentation tools establish an audiovisual connection between multiple users, allowing the users to see and hear other users, and allowing a user to share his or her screen to the other users. Digital collaboration is an increasingly crucial field in the business world, enabling communication and collaboration between large numbers of disparately located individuals.

In the business context, among others, group editing tools are often used in conjunction with presentation programs, for instance to allow one or more presenting users to share the collaborative document on their screen with the other call participants and highlight changes, indicate elements or sections of the document, make changes in real time, et cetera, while speaking to the other users. Unfortunately, collaborative editing can be a major source of disruption: when one user is presenting and attempts to show his or her screen, collaborative editing features can become distracting, as a multitude of cursors move around the screen, selecting and editing text, which detracts from the presentation. As such, it may be advantageous to, among other things, implement a system that temporarily disables the real-time display of the edits and cursor movements from other users when someone is presenting.

According to one embodiment, the invention is a system which detects who is editing and speaking at run time, and temporarily disables the real-time display of edits and cursor movement from the presenting user. When the presenter finishes speaking, the system can immediately update the screen with the latest changes. The latest changes can be rendered in various ways to bring them to the attention of the presenting user.

Various embodiments provide for computer-implemented method for sharing image data between two or more devices. The method may include rendering, by a first device, data on a shared screen. The shared screen is simultaneously displayed on each of the two or more devices. Each device has a capability to perform editing operations (add, delete, modify, move) on the data being rendered on the shared screen. Each device has a capability to communicate speech on an audio channel. In addition, the method may include determining that a first user of the first device is speaking on the audio channel. In response to determining that the first user of the first device is speaking, the method includes suspending display of any editing operations received from any of the two or more devices other than the first device. Further the method may include determining that the first user of the first device has stopped speaking on the audio channel (for longer than a predetermined time period). In response to determining that the first user of the first device has speaking, the method may include displaying the suspended editing operations received from any of the two or more devices other than the first device. Each device simultaneously displays a cursor on the shared screen and the method may further include suspending movement of cursors of any of the two or more devices other than the first device when the first user is speaking.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to interface with presentation software and group editing software to identify when a user is presenting, hide distracting UI elements for the duration of the presentation, and summarize hidden changes to users when the presentation is over.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Group editing program 108 may be any software program enabled to display a document to multiple users, and to allow multiple users to view/edit the document at the same time. Group editing program 108 may graphically represent other users' cursors on the screen, and may visually associate identifying text or graphics with each cursor to identify the user to which the cursor belongs. Likewise, changes made to the document may be highlighted and tagged with the user responsible for the change, so that each user's contribution may be visually apparent. Examples of group editing program 108 include Box Notes® (Box Notes® and all Box Notes®-based trademarks and logos are trademarks or registered trademarks of Box, Incorporated and/or its affiliates), Google® Docs (Google® and all Google®-based trademarks and logos are trademarks or registered trademarks of Google LLC and/or its affiliates), and Mural™ (Mural™ and all Mural™-based trademarks and logos are trademarks or registered trademarks of Tactivos Inc. and/or its affiliates). In an embodiment, instead of a cursor that is associated with a user, a user may be provided with the capability to drag and position a visual representation (or icon) of a small piece of paper having words printed thereon. For example, the small piece of paper icon may have an appearance similar to a small piece of paper with a re-adherable strip of glue on its back, made for temporarily attaching notes to documents and other surfaces, e.g., post-it note. Mural™ is a group design tool where multiple users can drag the on screen post-it notes at the same time and they can see each other's updates on the screen. It should be appreciated, that while the term "cursor" is used in this description, these references to "cursor" are meant to include any suitable visual representation, graphic symbol, or icon that may be employed in group editing program 108, such as a post-it note icon.

Presentation program 118 may be any software program enabled to establish an audiovisual connection between multiple users, allowing the users to see and hear other users, conduct presentations, and enabling a user to share his or her screen to the other users. Examples of presentation program 118 may include Webex® (Webex® and all Webex®-based trademarks and logos are trademarks or registered trademarks of Cisco Technology, Inc. and/or its affiliates), Zoom® (Zoom® and all Zoom®-based trademarks and logos are trademarks or registered trademarks of Zoom Video Communications and/or its affiliates), Skype® (Skype® and all Skype®-based trademarks and logos are trademarks or registered trademarks of Microsoft Corporation and/or its affiliates), and GoTo® (Box Notes® and all Box Notes®-based trademarks and logos are trademarks or registered trademarks of LogMeIn, Inc. and/or its affiliates).

While group editing program 108 and presentation program 118 are depicted herein as separate discrete programs hosted on the client computing device, one skilled in the art would understand that group editing program 108 and presentation program 118 may be components or subroutines of a single program, or may be individually or jointly distributed in functionality over multiple programs. Group editing program 108 and presentation program 118 may each be located on client computing device 102 or server 112 or on any other device located within network 114. Furthermore, group editing program 108 and presentation program 118 may be distributed in their operation over multiple devices, such as client computing device 102 and server 112.

Client computing device 102 may include a processor 104 and a data storage device 106 that is enabled to host and run a group editing program 108, a presentation program 118, and an editing enhancement program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a editing enhancement program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the editing enhancement program 110A, 110B may be a program capable of interface with presentation software and group editing software to identify when a user is presenting, hide distracting UI elements for the duration of the presentation, and summarize hidden changes to users when the presentation is over. The editing enhancement program 110A, 110B may be located on client computing device 102 or server 112 or on any other device located within network 114. Furthermore, editing enhancement may be distributed in its operation over multiple devices, such as client computing device 102 and server 112. Additionally, editing enhancement program 110A, 110B may be integrated with group editing program 108 and/or presentation program 118 in any combination. The editing enhancement method is explained in further detail below with respect to FIG. 2.

Figure 2:
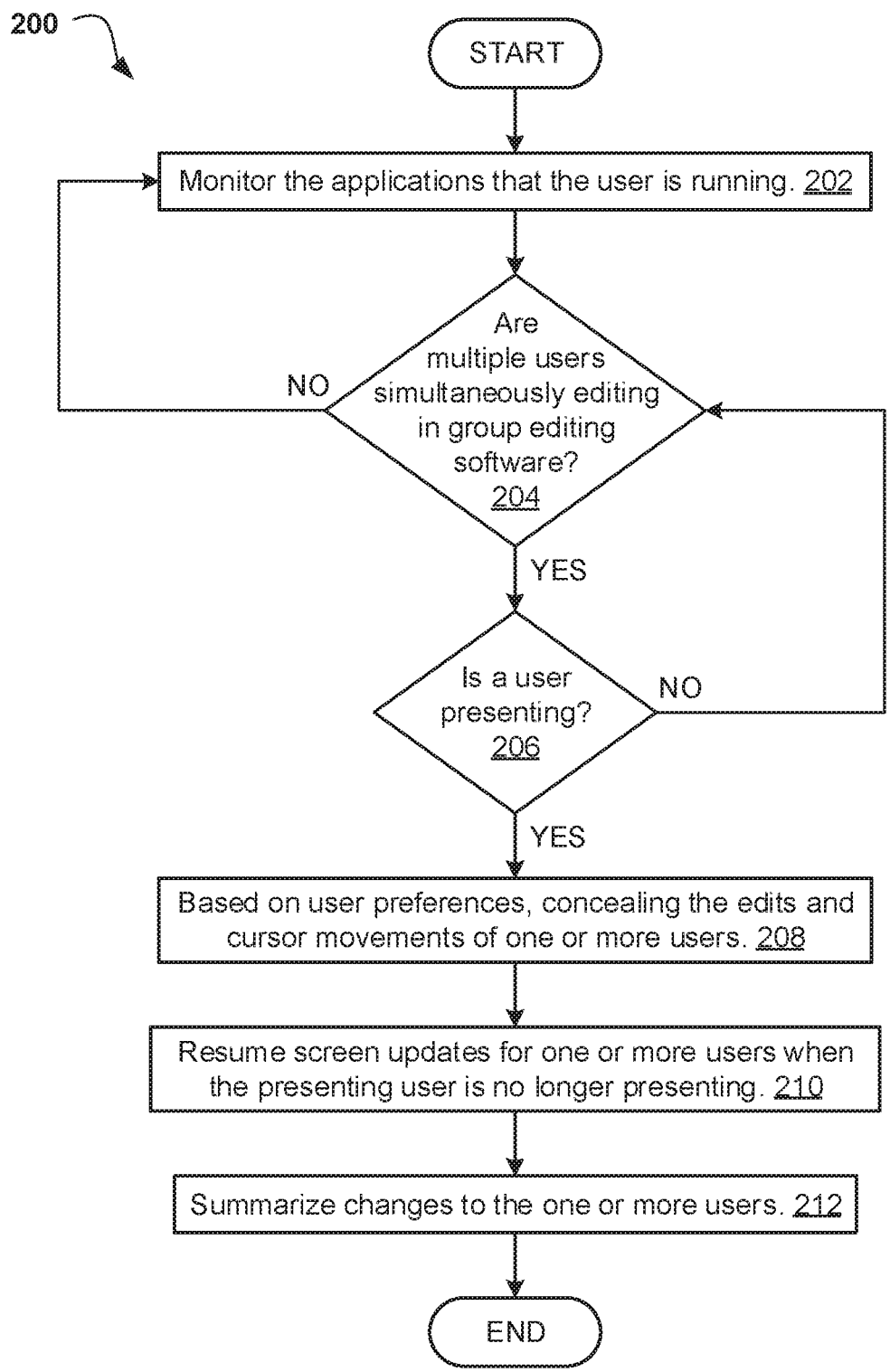
FIG. 2 is an operational flowchart illustrating an editing enhancement process according to at least one embodiment.

Referring now to FIG. 2, an operational flowchart illustrating an editing enhancement process 200 is depicted according to at least one embodiment. At 202, the editing enhancement program 110A, 110B monitors the applications that a user is running. The editing enhancement program 110A, 110B may be installed at the operation system level where the program monitors what software applications the user is actively using. The editing enhancement program 110A, 110B may also monitor the user's current activities, such as whether the user is on a conference call to discuss anything related to what is being displayed on the screen.

At 204, the editing enhancement program 110A, 110B determines whether multiple users are simultaneously editing in group editing software. The editing enhancement program 110A, 110B may, based on identifying that group editing program 108 is active, query group editing program 108 to determine the number of logged-in users for a given digital collaborative document, and determining that multiple users are simultaneously editing if that number is greater than one. In some embodiments, editing enhancement program 110A, 110B may use machine vision to analyze the display output and identify cursors or other graphical elements corresponding to individual users within a group editing program 108, and determining that multiple users are simultaneously editing if graphical elements corresponding with two or more unique users are found. Graphical elements may include cursors, edits or visual touches intended to highlight edits, and identifiers, which may be visual elements that identify a user in some way. According to one implementation, if the editing enhancement program 110A, 110B determines that multiple users are simultaneously editing in group editing software (step 204, "YES" branch), the editing enhancement program 110A, 110B may continue to step 206 to determine whether a user is presenting. If the editing enhancement program 110A, 110B determines that multiple users are not simultaneously editing in group editing software (step 206, "NO" branch), the editing enhancement program 110A, 110B may continue to step 202 to monitor the applications that the user is running.

Then, at 206, the editing enhancement program 110A, 110B determines whether a user is presenting. The editing enhancement program 110A, 110B may determine whether a user is presenting by identifying, based on monitoring, that a presentation program 118 and a group editing program 108 are active at the same time. In some embodiments, if a presentation program 118 and a group editing program 108 are active at the same time, editing enhancement program 110A, 110B may query presentation program 118 as to whether screen sharing is enabled; if screen sharing is enabled, editing enhancement program 110A, 110B may conclude that a user is presenting. In another embodiment, such as where editing enhancement program 110A, 110B cannot query a presentation program 118, editing enhancement program 110A, 110B may compare the output of the group editing program 108 against what is currently being displayed on the screen, and if presentation program 118 is maximized and the current display matches in whole or in part the output of group editing program 108, editing enhancement program 110A, 110B may infer that screen sharing is enabled and that a user is presenting. In another embodiment, editing enhancement program 110A, 110B may prompt a user (or receive an input from a user) to indicate whether or when a presentation is underway. In various embodiments, the editing enhancement program 110A, 110B determines whether a user is presenting by determining whether a user designated as a presenter is speaking. In this regard, the editing enhancement program 110A, 110B may monitor an audio channel to determine whether a conference call is underway. The monitored audio channel may be an audio channel provided by a telephone system or an audio channel provided as part of the presentation program 118. The editing enhancement program 110A, 110B may employ speech recognition APIs (application program interfaces) to identify which user of a plurality of users is speaking. The editing enhancement program 110A, 110B may employ speech recognition APIs to determine the content of what is spoken and to determine whether the words spoken on the conference call are related to the subject matter being simultaneously displayed on screen in the presentation program 118. The identity of the speaker and the content of the spoken words may be used to determine whether a user is presenting. In one embodiment, the editing enhancement program 110A, 110B may determine that a user is presenting when it detects that too many different cursors movements are happening on the screen at the same time, e.g., a number of simultaneous cursor movements exceeds a threshold, e.g. three. The criteria of evaluating the number of simultaneous cursor movements with respect to a threshold may be employed on a standalone basis or in combination with other methods for determining a user is presenting. According to one implementation, if the editing enhancement program 110A, 110B determines that a user is presenting (step 206, "YES" branch), the editing enhancement program 110A, 110B may continue to step 208 to, based on user preferences, conceal the edits and cursor movements of users. If the editing enhancement program 110A, 110B determines that a user is not presenting (step 206, "NO" branch), the editing enhancement program 110A, 110B may continue to step 204 to determine whether multiple users are simultaneously editing in group editing software.

At 208, the editing enhancement program 110A, 110B, based on user preferences, conceals the edits and cursor movements of one or more users. The editing enhancement program 110A, 110B may consult user preferences with regard to which graphical elements to conceal, when to implement the concealing, how to trigger the concealing, et cetera. For instance, a user may wish to conceal the graphical elements of every user but the presenting users. Or, the user may wish to conceal all but one presenting user, such as where there are multiple presenting users but only one presenting user is knowledgeable about or designated for interacting with the collaborative digital document. In some embodiments, the presenting users may control what all other users see for the duration of the presentation. The editing enhancement program 110A, 110B may conceal the edits and cursor movements of one or more users by sending a request or otherwise interfacing with presentation program 118 to disable collaborative editing features to the desired extent. In some embodiments, the editing enhancement program 110A, 110B may monitor the cursor movement among different user's editing behaviors, and automatically remove all cursors and edits if, for instance, a threshold of cumulative cursor movement and/or magnitude of edits are occurring on the screen at the same time. In another embodiment, the editing enhancement program 110A, 110B may remove individual cursors and edits if a threshold of individual cursor movement and/or magnitude of edits occurs within a set timeframe. Magnitude of edits may pertain to the number of edits made within a set period of time, and cursor movement may pertain to any combination of speed and distance of cursor movement within a set period of time.

In some embodiments, even after concealing cursors and/or edits, the editing enhancement program 110A, 110B can provide some minimal visual cues to the user to indicate the document is being updated by other users. For instance, by showing an icon along with other user's name on a side panel when that user is editing, or by utilizing a visual indicator such as a rectangle containing vertical bars of configurable spacing over edited text or elsewhere on the document to represent the time frame or amount of changes made to the shared documents, optionally color-coded by user. In some embodiments, a user can decide to manually enable and disable the functionality where editing enhancement program 110A, 110B stops updating the screen changes from other users while the user is speaking to the audience. In some embodiments, editing enhancement program 110A, 110B may, instead of concealing cursors or edits for the duration of the presentation, editing enhancement program 110A, 110B may modify the graphical elements to make them less disruptive, such as by hiding cursor movements for users but allowing edits to be made, or by showing edits but not highlighting them with a user's identifier.

At 210, the editing enhancement program 110A, 110B resumes screen updates for one or more users when the presenting user is no longer presenting. The editing enhancement program 110A, 110B may restore the concealed graphical elements for all affected users so that cursors and changes can be once again seen in real time. The editing enhancement program 110A, 110B may identify that a presenting user is no longer presenting by determining that the presentation program 118 and the group editing program 108 are no longer active at the same time. In some embodiments, editing enhancement program 110A, 110B may query presentation program 118 as to whether screen sharing is enabled; if screen sharing is no longer enabled, editing enhancement program 110A, 110B may conclude that the presenting user is no longer presenting. In another embodiment, such as where editing enhancement program 110A, 110B cannot query a presentation program 118, editing enhancement program 110A, 110B may compare the output of the group editing program 108 against what is currently being displayed on the screen, and if presentation program 118 is maximized but the current display does not match the output of group editing program 108, editing enhancement program 110A, 110B may infer that screen sharing is no longer enabled and that the presenting user is no longer presenting. In another embodiment, editing enhancement program 110A, 110B may prompt a user to indicate when a presentation has concluded. In various embodiments, the editing enhancement program 110A, 110B may employ any method described herein to determine whether a user is presenting to determine that the user is not currently presenting at a particular point in time.

At 212, the editing enhancement program 110A, 110B summarizes changes to the one or more users. During the presentation, real-time changes will be hidden from at least one user; the user may then fail to notice these changes once the presentation has concluded. To address this possibility, editing enhancement program 110A, 110B may graphically render changes created during the presentation in various ways to bring them to the user's attention. For example, editing enhancement program 110A, 110B may display all the changes from every user since the time that the presenting user concluded his/her presentation; display all the changes from only certain users since the time that the presenting user concluded his/her presentation; display all the changes from every user made during the presentation, with visual aids to indicate the specific updates/contribution from each user; display changes in timed increments, for example: the first 5 minutes or the last 5 minutes of the presentation; display all the changes in chronological order so that the evolution of the content may be easily seen; and/or display a user when there is interaction between the user and portions of the document (i.e. editing) rather than displaying the user's cursor moving from point A to point B.

Figure 3:
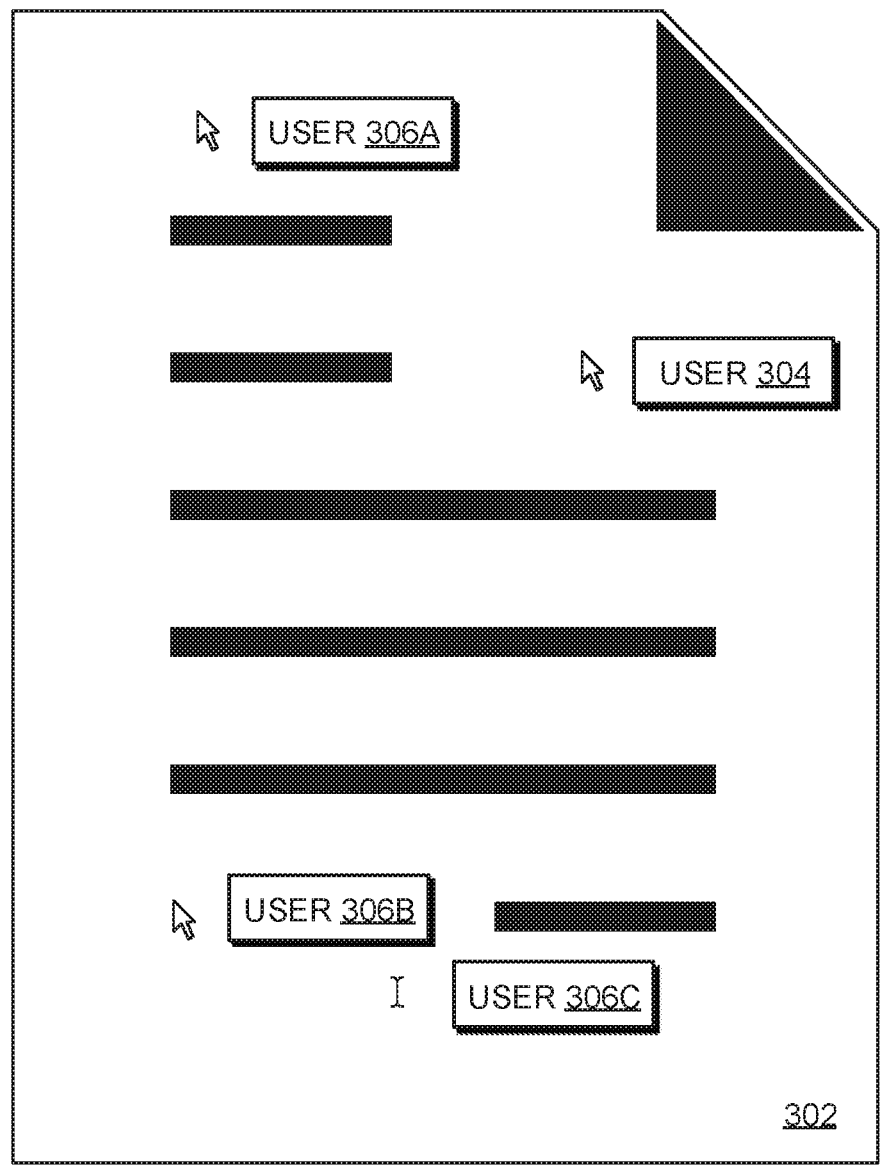
FIG. 3 illustrates an exemplary graphical user interface (GUI) of an editing enhancement process according to at least one embodiment.

Referring now to FIG. 3, an exemplary graphical user interface (GUI) 300 of an editing enhancement program 110A, 110B is depicted according to at least one embodiment. Collaborative document 302 may be a document made available to presenting user 304 and users 306A, 306B, 306C for viewing and editing by group editing program 108. Each user's cursor is tagged with a square of text which identifies the user. Collaborative document 302 may further be shared by presenting user 304 to users 306A, 306B, 306C via presentation program 118, such that GUI 300 as presented herein is visible on the screens of presenting user 304 and other users 306A, 306B, 306C. The editing enhancement program 110A, 110B may, upon detecting the presence of multiple users 306A, 306B, 306C within group editing program 108, and upon detecting that a presentation is in progress, hide the cursors and changes of users 306A, 306B, 306C from all users within presentation program 118, but allow the cursor and edits of presenting user 304 to remain visible. The editing enhancement program 110A, 110B may then summarize the changes made by each user within the program during the presentation when the presentation has concluded.

It may be appreciated that FIGS. 2 and 3 provide only illustrations of individual implementations and do not imply any limitations with regard to how different embodiments may be implemented. Many modifications to the depicted environments may be made based on design and implementation requirements.

Figure 4:
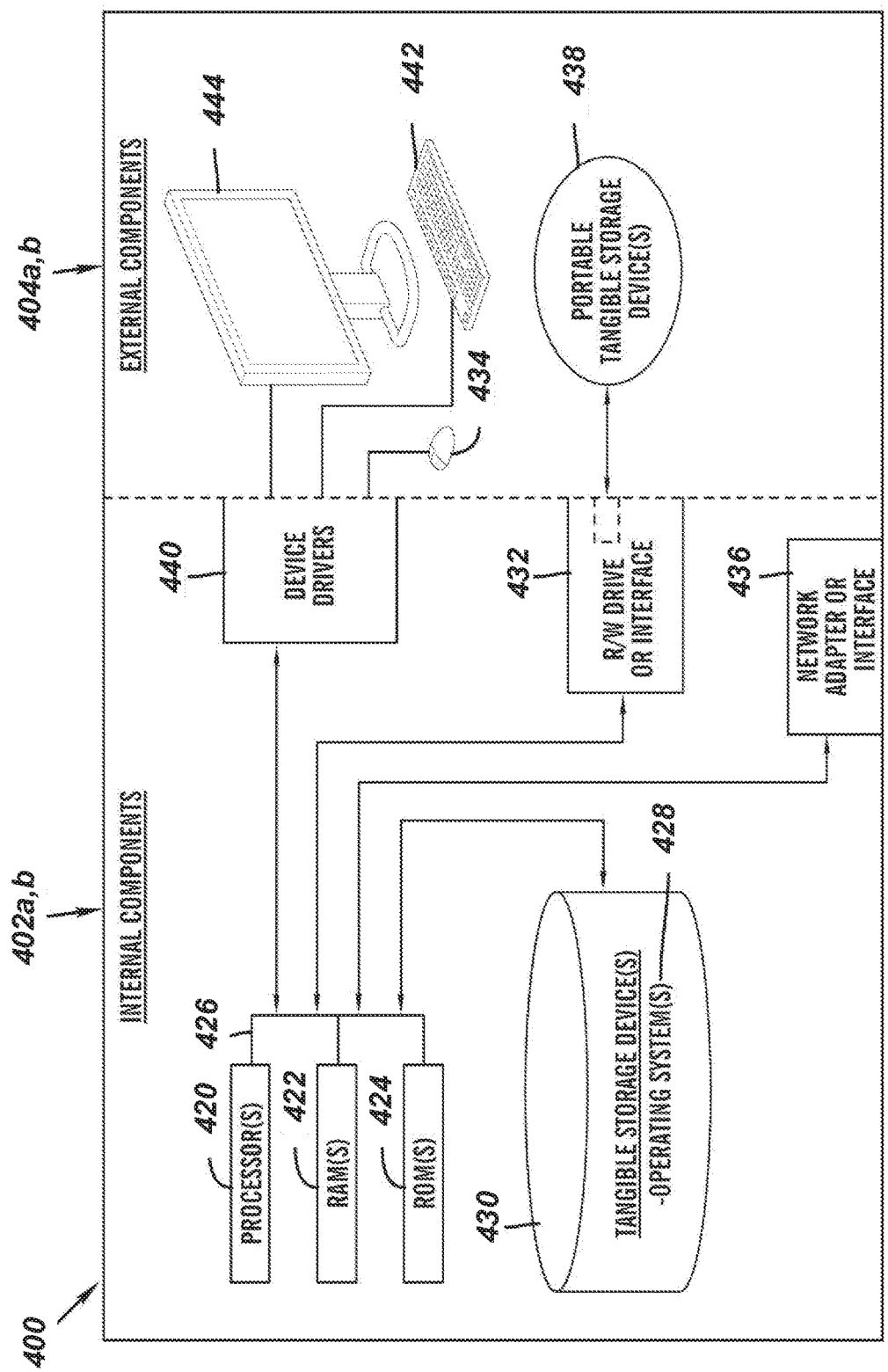
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may be represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the group editing program 108, a presentation program 118, and the editing enhancement program 110A in the client computing device 102, and the editing enhancement program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the editing enhancement program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The group editing program 108, a presentation program 118, and the editing enhancement program 110A in the client computing device 102 and the editing enhancement program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the group editing program 108, a presentation program 118, and the editing enhancement program 110A in the client computing device 102 and the editing enhancement program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
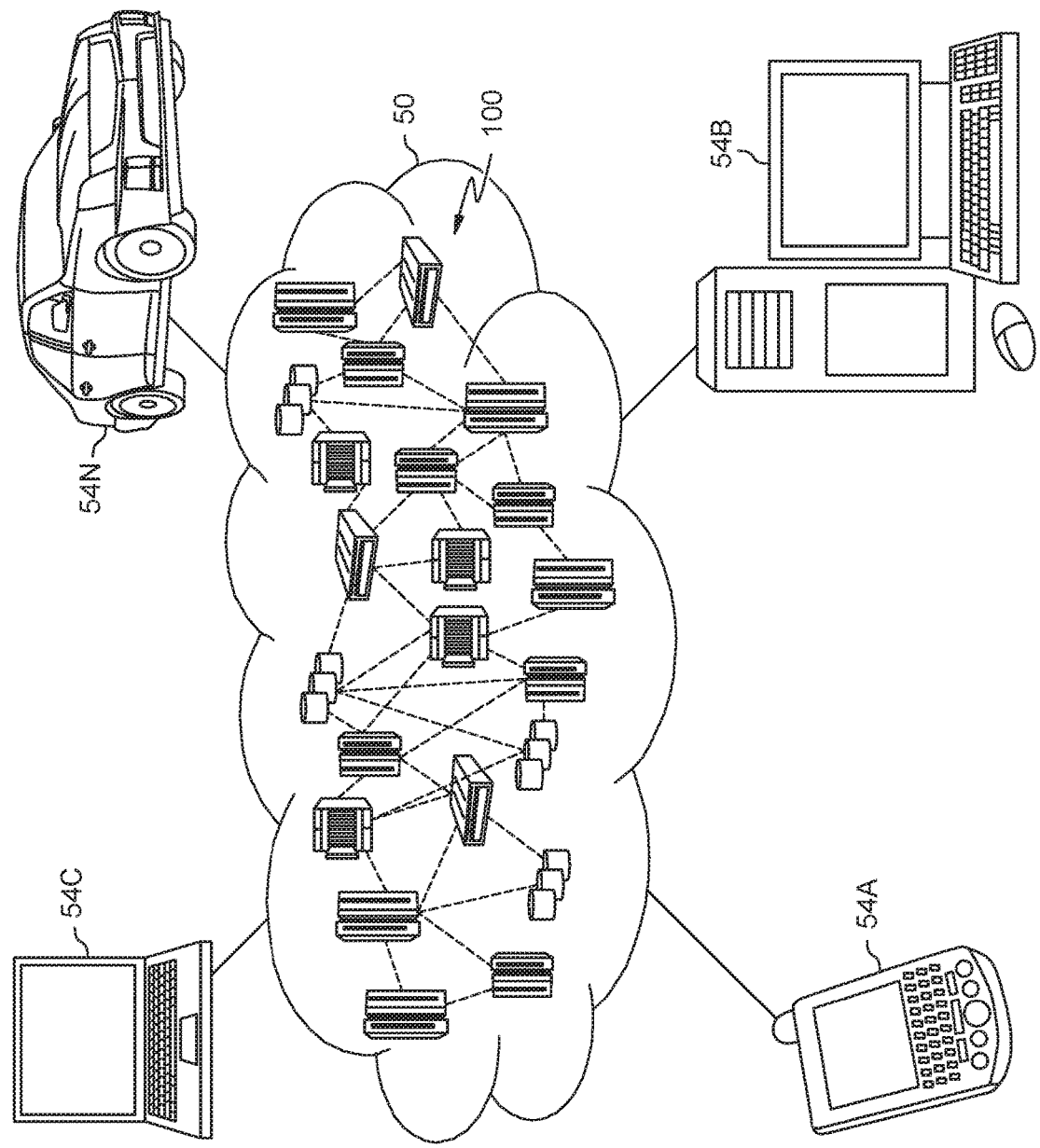
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
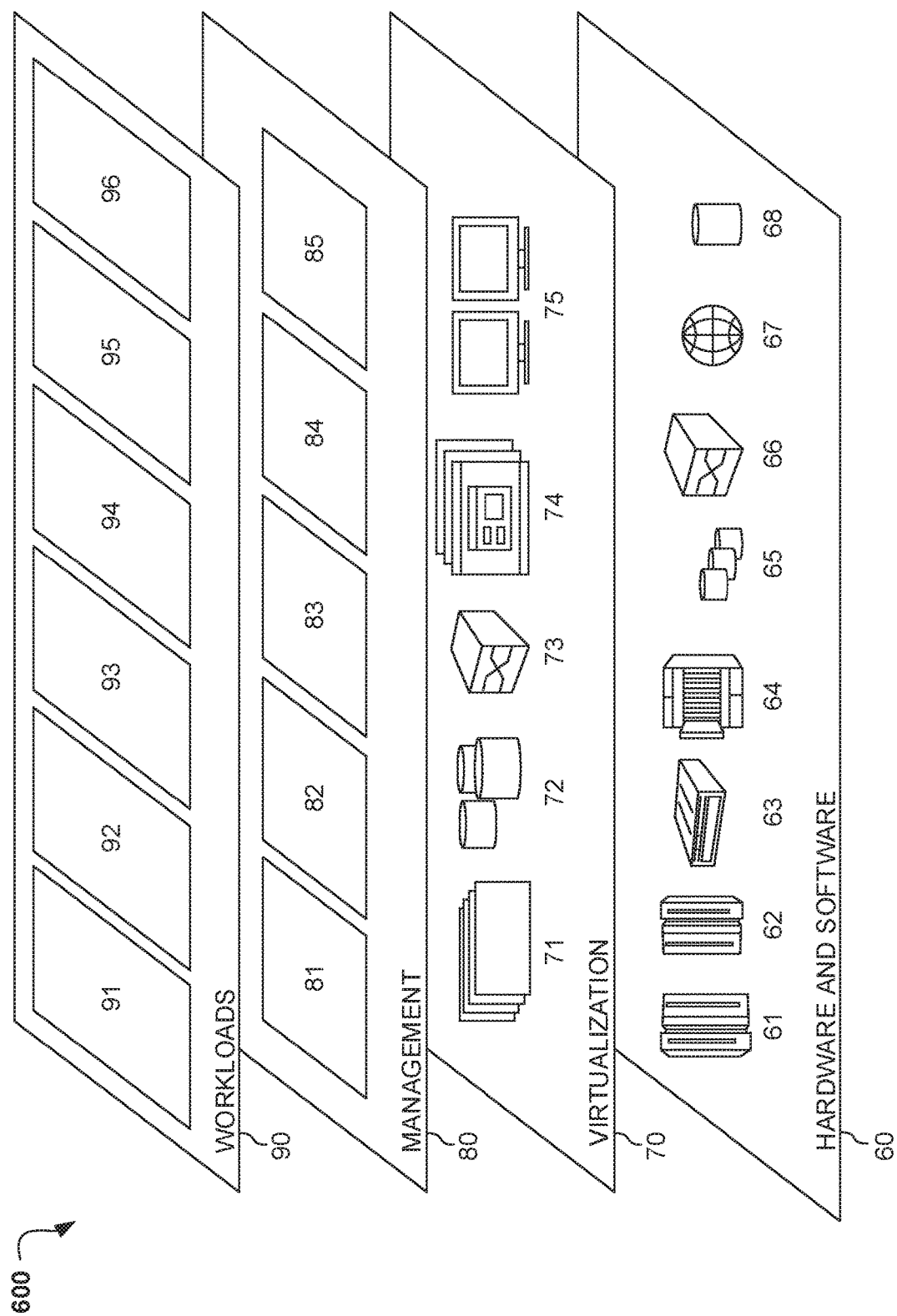
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and editing enhancement 96. editing enhancement 96 may relate to interfacing with presentation software and group editing software to identify when a user is presenting, hiding distracting UI elements for the duration of the presentation, and summarizing hidden changes to users when the presentation is over.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for concealing graphical user interface elements within collaborative editing software, the method comprising:
    responsive to determining that one or more presenting users are conducting a presentation and that one or more users are editing a digital collaborative document, operating a computer to conceal one or more graphical user interface elements based on the one or more graphical user interface elements exceeding a threshold level of movement; and
    responsive to determining that the one or more presenting users are no longer conducting the presentation, graphically summarizing one or more changes to the digital collaborative document made during the presentation.

2. The method of claim 1, further comprising:
    identifying that a presentation program and a group editing program are running on a user's computing device.

3. The method of claim 1, wherein the one or more graphical user interface elements are selected from a list comprising:
    edits, cursor movements, cursors, and identifiers.

4. The method of claim 1, further comprising:
    adding one or more minimal graphical user interface elements during the presentation.

5. The method of claim 1, wherein the one or more graphical user interface elements are concealed from the presenting users.

6. The method of claim 1, wherein the one or more graphical user interface elements are concealed from all users except the one or more presenting users.

7. A computer system for concealing graphical user interface elements within collaborative editing software, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        responsive to determining that one or more presenting users are conducting a presentation and that one or more users are editing a digital collaborative document, operating a computer to conceal one or more graphical user interface elements based on the one or more graphical user interface elements exceeding a threshold level of movement; and
        responsive to determining that the one or more presenting users are no longer conducting the presentation, graphically summarizing one or more changes to the digital collaborative document made during the presentation.

8. The computer system of claim 7, further comprising:
    identifying that a presentation program and a group editing program are running on a user's computing device.

9. The computer system of claim 7, wherein the one or more graphical user interface elements are selected from a list comprising:
    edits, cursor movements, cursors, and identifiers.

10. The computer system of claim 7, further comprising:
    adding one or more minimal graphical user interface elements during the presentation.

11. The computer system of claim 7, wherein the one or more graphical user interface elements are concealed from the presenting users.

12. The computer system of claim 7, wherein the one or more graphical user interface elements are concealed from all users except the one or more presenting users.

13. A computer program product for concealing graphical user interface elements within collaborative editing software, the computer program product comprising:
    one or more computer-readable tangible storage medium and program instructions stored on at least one of the one or more tangible storage medium, the program instructions executable by a processor to cause the processor to perform a method comprising:
        responsive to determining that one or more presenting users are conducting a presentation and that one or more users are editing a digital collaborative document, operating a computer to conceal one or more graphical user interface elements based on the one or more graphical user interface elements exceeding a threshold level of movement; and
        responsive to determining that the one or more presenting users are no longer conducting the presentation, graphically summarizing one or more changes to the digital collaborative document made during the presentation.

14. The computer program product of claim 13, further comprising:
    identifying that a presentation program and a group editing program are running on a user's computing device.

15. The computer program product of claim 13, wherein the one or more graphical user interface elements are selected from a list comprising:
  edits, cursor movements, cursors, and identifiers.

16. The computer program product of claim 13, further comprising:
  adding one or more minimal graphical user interface elements during the presentation.

17. The computer program product of claim 13, wherein the one or more graphical user interface elements are concealed from the presenting users.

* * * * *